3,686,165
Patented Aug. 22, 1972

3,686,165
2-(DI-LOWER ALKYLAMINOALKYL)-2,3,4,5-TETRAHYDRO-5-PHENYL-1H-2-BENZAZEPIN-1-ONES
Bernard Loev, Broomall, Pa., assignor to Smith Kline & French Laboratories, Philadelphia, Pa.
No Drawing. Filed Sept. 9, 1970, Ser. No. 70,880
Int. Cl. C07d 41/06, 41/08
U.S. Cl. 260—239.3 B          4 Claims

ABSTRACT OF THE DISCLOSURE

The compounds are 2 - (di - lower alkylaminoalkyl)-2,3,4,5 - tetrahydro - 5 - phenyl-1H-2-benzazepin-1-ones which inhibit gastric acid secretion.

---

This invention relates to new 2-(di-lower alkylaminoalkyl) - 2,3,4,5 - tetrahydro-5-phenyl-1H-2benzazepin-1-ones having pharmacodynamic activity. In particular, these compounds inhibit gastric acid secretion.

The compounds of this invention are representation by the following formula:

FORMULA I

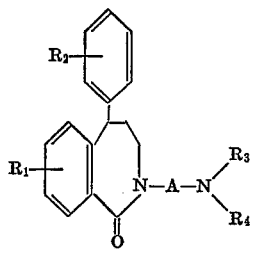

in which:

A is alkylene having 2–4 carbon atoms, preferably ethylene or propylene;

$R_1$ is hydrogen, halo, lower alkyl or lower alkoxy;

$R_2$ is hydrogen, halo, trifluoromethyl, lower alkyl or lower alkoxy and $R_3$ and $R_4$ are lower alkyl and pharmaceutically acceptable, acid addition salts thereof.

A preferred compound of this invention is represented by Formula I above in which A is propylene, $R_1$ and $R_2$ are hydrogen and $R_3$ and $R_4$ are methyl.

The compounds of Formula I produce inhibition of gastric acid secretion by increasing the gastric pH or decreasing the volume of gastric juice. This activity is demonstrated by administration to chronic gastric fistula rats (Brodie et al., Amer. J. Physiol., 202:812–814, 1962) at doses of about 30–50 mg./kg. orally.

The compounds of this invention are prepared by the following procedure:

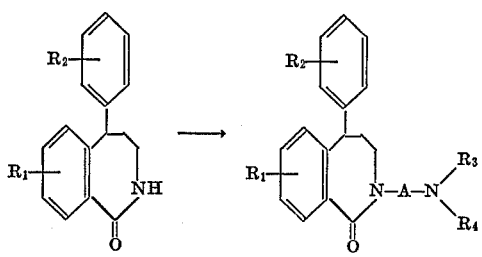

The terms $R_1$, $R_2$, $R_3$, $R_4$ and A are as defined above.

According to the above procedure, a 2,3,4,5-tetrahydro-5-phenyl-1H-2benzazepin-1-one is reacted with a di-lower alkylaminoalkyl halide, such as a chloride or bromide, to give the 2-(di-lower alkylaminoalkyl)-2,3,4,5-tetrahydro-5-phenyl-1H-2-benzazepin-1-ones of this invention.

The 2,3,4,5 - tetrahydro - 5-phenyl-1H-2-benzezapin-1-one starting materials are prepared by reacting a 3,4-dihydro - 4-phenyl-1(2H)-naphthalenone of the following formula:

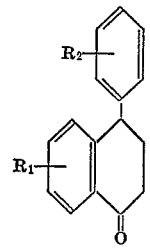

with hydrogen azide and a mineral acid, such as sulfuric acid, or with sodium azide, acetic acid and a mineral acid, such as sulfuric acid. By this procedure, the 2,3,4,5-tetrahydro-5-phenyl-1H-2-benzazepin-1-one is prepared with the corresponding 1,3,4,5-tetrahydro-5-phenyl-2H-1-benzazepin-2-one isomer. These isomers are separated by recrystallization or by chromatography.

The 3,4 - dihydro-4-phenyl-1(2H)-naphthalenone compounds are prepared by reacting a diphenylacetaldehyde of the formula:

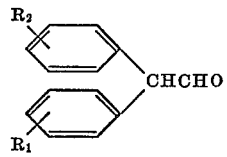

with malonic acid in the presence of an organic base such as pyridine to give a 4,4-diphenyl-3-butenoic acid of the formula:

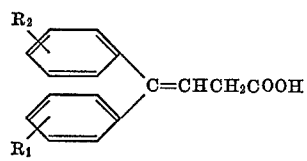

reducing the butenoic acid, for example by hydrogenating in the presence of a catalyst such as palladium on charcoal, and treating the resulting 4,4-diphenyl-3-butanoic acid with polyphosphoric acid or other Lewis acid known to cause ring closure.

The pharmaceutically acceptable, acid addition salts of the compounds of Formula I are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric, and nitric acids. Of course, these salts may also be prepared by the classical method of double decomposition of appropriate salts which is well-known to the art.

The terms "lower alkyl" and "lower alkoxy" where used herein denote groups having 1 to 4, preferably 1 to 2, carbon atoms and "halo" denotes chloro, bromo or fluoro.

The following examples are not limiting but are illustrative of the compounds of this invention and procedures for their preparation.

EXAMPLE 1

To 40 g. of 3,4-dihydro-4-phenyl-1(2H)-naphthalenone dissolved in 217 ml. of glacial acetic acid is added, gradually with stirring, 14.8 g. of sodium azide. Then 43.4 ml. of concentrated sulfuric acid is added at a slow dropwise rate over a 110 minute period, keeping the temperature at 25–35° C. The mixture is then stirred at room temperature for two hours, then warmed in a water bath to 50° C. and kept there for one hour. The water bath is then removed and the mixture is stirred for one more hour at room temperature. The mixture is poured into 1.1 liter of water and the solid is filtered off to give a mixture of 2,3,4,5-tetrahydro-5-phenyl-1H-2-benzazepin-2-one. These compounds are separated by fractional recrystallization using ethyl acetate (2,3,4,5 - tetrahydro-5-phenyl-1H-2-benzazepin-1-one being the less soluble compound).

To 1.76 g. of a dispersion of sodium hydride in mineral oil suspended in 20 ml. of dry dimethylsulfoxide is added, dropwise with stirring, a solution of 2,3,4,5-tetrahydro-5-phenyl-1H-2-benzazepin-1-one in 700 ml. of dimethylsulfoxide. The solution is then stirred for one hour and 13.8 g. of 3-dimethylaminopropyl chloride dissolved in about 100 ml. of dry benzene is added at a rapid dropwise rate. The resulting solution is stirred and warmed on a steam bath overnight, then chilled in ice. Ethanol (2 ml). is added and the mixture is filtered. The filtrate is concentrated in vacuo, then diluted with water and extracted with dilute hydrochloric acid. The acid extract is made basic with 40% aqueous sodium hydroxide solution. The oily layer is allowed to stand and is chilled and then filtered. The solid is dissolved in ether and the ether solution is dried over magnesium sulfate, then concentrated. The residue is combined with the residue obtained by extracting the filtrate obtained above with ether, then drying and concentrating the extract. This material is recrystallized from isopropanol using charcoal to give 2-[3-dimethylamino)propyl] - 2,3,4,5-tetrahydro-5-phenyl-1H-2-benzazepin-1-one.

To a hot solution of 2-[3-(dimethylamino)propyl]-2,3,4,5-tetrahydro-5-phenyl-1H-2-benzazepin-1-one in isopropanol is added ethereal hydrogen chloride. Cooling, filtering and recrystallizing from ethanol gives the hydrochloride salt of 2-[3-(dimethylamino)propyl]-2,3,4,5-tetrahydro-5-phenyl-1H-2-benzazepin-1-one.

EXAMPLE 2

Using 2-dimethylaminoethyl chloride in place of 3-dimethylaminopropyl chloride in the procedure of Example 1, the product is 2-[2-(dimethylamino)ethyl]-2,3,4,5-tetrahydro-5-phenyl-1H-2-benzazepin-1-one.

2 - [2 - (dimethylamino)ethyl] - 2,3,4,5-tetrahydro-5-phenyl-1H-2-benzazepin-1-one and an equimolar amount of maleic acid are reacted in ethyl acetate at room temperature to give, after evaporating to dryness in vacuo and recrystallizing the residue from isopropanol, the maleate salt of 2-[2-(dimethylamino)ethyl]-2,3,4,5-tetrahydro-5-phenyl-1H-2-benzazepin-1-one.

EXAMPLE 3

Malonic acid (104 g.) and 4 ml. of pyridine are added to 264 g. of bis(p-chlorophenyl)acetaldehyde dissolved in 1 liter of dry toluene. The resulting mixture is stirred and heated slowly to reflux on a steam bath and refluxing is continued for about 2.5 hours. The solution is chilled and the solid is filtered off, washed with dilute hydrochloric acid and then with water to give 4,4-di(p-chlorophenyl)-3-butenoic acid.

4,4-di(p-chlorophenyl)-3-butenoic acid (306 g.) is added to a dilute aqueous sodium hydroxide solution. Palladium on charcoal is added and the mixture is hydrogenated under reduced pressure, then filtered and acidified with concentrated hydrochloric acid. Filtering gives 4,4-di(p-chlorophenyl)-butanoic acid.

To 3 kg. of polyphosphoric acid at 140° C. is added 123.2 g. of 4,4-di(p-chlorophenyl)butanoic acid with stirring. The resulting mixture is then stirred manually, heated to 160° C. and kept at 160° C. for 10 minutes, then cooled slightly and poured onto a large volume of ice and stirred. The solid is filtered off and dissolved in ether. The ether solution is washed with 10% aqueous sodium hydroxide solution and then with water, dried, treated with charcoal, filtered and concentrated in vacuo to give 7 - chloro - 4-(p-chlorophenyl)-3,4-dihydro-1(2H)-naphthalenone.

Using 7-chloro-4-(p-chlorophenyl)-3,4-dihydro-1(2H)-naphthalenone in place of 3,4-dihydro-4-phenyl-1(2H)-naphthalenone in the procedure of Example 1, the product is 8-chloro-5-(p-chlorophenyl)-2-[3-(dimethylamino)propyl]-2,3,4,5-tetrahydro-1H-2-benzazepin-1-one.

EXAMPLE 4

By the procedure of Example 3 using, in place of bis(p-chlorophenyl)acetaldehyde, the following acetaldehyde compounds:

bis(p-bromophenyl)acetaldehyde
bis(p-fluorophenyl)acetaldehyde
o-chlorophenyl-p-chlorophenylacetaldehyde
bis(p-methoxyphenyl)acetaldehyde
di(p-tolyl)acetaldehyde
phenyl-p-tolylacetaldehyde
o-tolyl-p-tolylacetaldehyde the following products are obtained:

8-bromo-5-(p-bromophenyl)-2-[3-(dimethylamino)propyl]-2,3,4,5-tetrahydro-1H-2-benzazepin-1-one
2-[3-(dimethylamino)propyl]-8-fluoro-5-(p-fluorophenyl)-2,3,4,5-tetrahydro-1H-2-benzazepin-1-one
8-chloro-5-(o-chlorophenyl)-2-[3-(dimethylamino)propyl]-2,3,4,5-tetrahydro-1H-2-benzazepin-1-one and 6-chloro-5-(p-chlorophenyl)-2-[3-(dimethylamino)propyl]-2,3,4,5-tetrahydro-1H-2-benzazepin-1-one
2-[3-(dimethylamino)propyl]-2,3,4,5-tetrahydro-8-methoxy-5-(p-methoxyphenyl)-1H-2-benzazepin-1-one
2-[3-(dimethylamino)propyl]-2,3,4,5-tetrahydro-8-methyl-5-(p-tolyl)-1H-2-benzazepin-1-one
2-[3-(dimethylamino)propyl]-2,3,4,5-tetrahydro-8-methyl-5-phenyl-1H-2-benzazepin-1-one and 2-[3-dimethylamino)propyl]-2,3,4,5-tetrahydro-5-(p-tolyl)-1H-2-benzazepin-1-one
2-[3-(dimethylamino)propyl]-2,3,4,5-tetrahydro-8-methyl-5-(o-tolyl)-1H-2-benzazepin-1-one and 2-[3-dimethylamino)propyl]-2,3,4,5-tetrahydro-6-methyl-5-(p-tolyl)-1H-2-benzazepin-1-one.

EXAMPLE 5

Using 3-diethylaminopropyl chloride in place of 3-dimethylaminopropyl chloride in the procedure of Example 1, the product is 2-[3-(diethylamino)propyl]-2,3,4,5-tetrahydro-5-phenyl-1H-2-benzazepin-1-one.

Also, using, in place of 3-dimethylaminopropyl chloride in the procedure of Example 1, the following:

3-dimethylamino-1-methylpropyl bromide
4-dimethylaminobutyl chloride the products are:

2-[3-(dimethylamino)-1-methylpropyl]-2,3,4,5-tetrahydro-5-phenyl-1H-2-benzazepin-1-one
2-[4-(dimethylamino)butyl]-2,3,4,5-tetrahydro-5-tetrahydro-5-phenyl-1H-2-benzazepin-1-one.

EXAMPLE 6

A solution of 125 g. of p-trifluoromethylbenzophenone and 98 g. of methyl α-chloropropionate in 200 ml. of anhydrous ether is cooled to 10° C. and 45.5 g. of sodium methoxide is added. After 20 hours, a cold solution of 30 ml. of hydrochloric acid in 200 ml. of water is added and the organic layer is separated, dried and concentrated. To the residue 200 ml. of 25% aqueous sodium hydroxide solution is added and the resulting mixture is stirred at 50° C. for 18 hours, then acidified with 6 N hydrochloric acid and extracted with ether. The extract is concentrated and the residue is heated in vacuo to 180° C. when decarboxylation and distillation occurs to give phenyl-p-trifluoromethylphenylacetaldehyde.

The phenyl - p - trifluoromethylphenylacetaldehyde is converted to 2-[3-(dimethylamino)propyl]-2,3,4,5-tetrahydro - 5 - (p-trifluoromethylphenyl)-1H-2-benzazepin-1-one by the procedure of Example 3.

EXAMPLE 7

By the procedure of Example 6 using m-chlorobenzophenone in place of p-trifluoromethylbenzophenone, m-chlorophenyl-phenylacetaldehyde is obtained. By the procedure of Example 3 using m-chlorophenyl-phenylacetaldehyde in place of bis(p-chlorophenyl)acetaldehyde the products are:

7-chloro-2-[3-(dimethylamino)propyl]-2,3,4,5-tetrahydro-5-phenyl-1H-2-benzazepin-1-one
9-chloro-2-[3-(dimethylamino)propyl]-2,3,4,5-tetrahydro-5-phenyl-1H-2-benzazepin-1-one and
5-(m-chlorophenyl)-2-[3-dimethylamino)propyl]-2,3,4,5-tetrahydro-1H-2-benzazepin-1-one.

By the same procedure using m-methoxybenzophenone as the starting material, the products are:

2-[3-(dimethylamino)propyl]-2,3,4,5-tetrahydro-7-methoxy-5-phenyl-1H-2-benzazepin-1-one
2-[3-(dimethylamino)propyl]-2,3,4,5-tetrahydro-9-methoxy-5-phenyl-1H-2-benzazepin-1-one and
2-[3-(dimethylamino)propyl]-2,3,4,5-tetrahydro-5-(m-methoxyphenyl)-1H-2-benzazepin-1-one.

Similarly, using m-methylbenzophenone as the starting material, the products are:

2-[3-(dimethylamino)propyl]-2,3,4,5-tetrahydro-7-methyl-5-phenyl-1H-2-benzazepin-1-one
2-[3-(dimethylamino)propyl]-2,3,4,5-tetrahydro-9-methyl-5-phenyl-1H-2-benzazepin-1-one and
2-[3-(dimethylamino)propyl]-2,3,4,5-tetrahydro-5-(m-tolyl)-1H-2-benzazepin-1-one.

What is claimed is:
1. A compound of the formula:

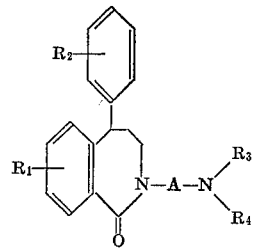

in which:
A is alkylene having 2 to 4 carbon atoms;
$R_1$ is hydrogen, halo, lower alkyl or lower alkoxy;
$R_2$ is hydrogen, halo, trifluoromethyl, lower alkyl or lower alkoxy and
$R_3$ and $R_4$ are lower alkyl or pharmaceutically acceptable, acid addition salts thereof.

2. A compound according to claim 1 in which A is ethylene or propylene.

3. A compound according to claim 1 in which A is propylene, $R_1$ and $R_2$ are hydrogen and $R_3$ and $R_4$ are methyl.

4. A compound according to claim 1 in which A is ethylene, $R_1$ and $R_2$ are hydrogen and $R_3$ and $R_4$ are methyl.

References Cited

UNITED STATES PATENTS 2,785,159   3/1971   Hoffmann et al. __ 260—239.3 B

OTHER REFERENCES

Subject Index Chemical Abstracts, vol. 67 (1967) abstracting Werner et al. "J. Med. Chem." vol. 10, No. 4, pp. 575–582 (1967).

Werner et al. "J. Med. Chem.," vol. 10, No. 4, pp. 575–582 (1967).

HENRY R. JILES, Primary Examiner

R. T. BOND, Assistant Examiner

U.S. Cl. X.R.

424—244